United States Patent
Peeters et al.

(10) Patent No.: US 9,531,540 B2
(45) Date of Patent: Dec. 27, 2016

(54) SECURE TOKEN-BASED SIGNATURE SCHEMES USING LOOK-UP TABLES

(71) Applicant: NXP B.V., Eindhoven (NL)

(72) Inventors: Michaël Peeters, Tourinnes-la-Grosse (BE); Joppe Bos, Interleuvenlaan (BE)

(73) Assignee: NXP B.V., Eindhoven (NL)

( * ) Notice: Subject to any disclaimer, the term of this patent is extended or adjusted under 35 U.S.C. 154(b) by 93 days.

(21) Appl. No.: 14/705,316

(22) Filed: May 6, 2015

(65) Prior Publication Data

US 2016/0182230 A1 Jun. 23, 2016

Related U.S. Application Data

(63) Continuation-in-part of application No. 14/580,963, filed on Dec. 23, 2014.

(51) Int. Cl.
| | | |
|---|---|---|
| *H04L 9/00* | (2006.01) | |
| *H04L 9/32* | (2006.01) | |
| *H04L 9/30* | (2006.01) | |

(52) U.S. Cl.
CPC ............ H04L 9/3234 (2013.01); H04L 9/302 (2013.01); H04L 9/3249 (2013.01); *H04L 2209/606* (2013.01)

(58) Field of Classification Search
USPC ........ 726/20, 27; 713/171, 194; 380/30, 284
See application file for complete search history.

(56) References Cited

U.S. PATENT DOCUMENTS

| | | | | |
|---|---|---|---|---|
| 4,885,777 | A * | 12/1989 | Takaragi ................. | G06Q 20/00 380/30 |
| 6,298,442 | B1 * | 10/2001 | Kocher .................... | G06F 7/723 380/28 |
| 2003/0072454 | A1 * | 4/2003 | Krawetz ................ | H04L 9/3236 380/284 |
| 2004/0054906 | A1 * | 3/2004 | Carro ...................... | G06F 21/64 713/171 |
| 2006/0064761 | A1 * | 3/2006 | Multerer ................. | G06F 21/10 726/27 |
| 2008/0226064 | A1 * | 9/2008 | Douguet .................. | G06F 7/723 380/30 |
| 2016/0019339 | A1 * | 1/2016 | Sazonov .................. | G06F 19/22 702/20 |
| 2016/0085955 | A1 * | 3/2016 | Lerner .................... | G06F 21/31 726/20 |

OTHER PUBLICATIONS

Devine, "Design and Implementation of DDH", A Distributed Dynami Hashing Alogrith, Proceeding FODO, pp. 101-114.
Menezes, et al., "Handbook of Applied Cryptography", ISBN, Chapters 9 and 11, 1997.

(Continued)

*Primary Examiner* — Sayed Beheshti Shirazi (57) ABSTRACT

Various embodiments relate to a method of generating tokens for use in modular exponentiation and a related device and non-transitory machine readable storage medium, including: generating a public token, τ, based on an identifier associated with another device; generating a private token, L, as a modular exponentiation of the public token, τ, using a private exponent, d, and modulus, N, from a cryptographic key; and communicating the private token, L, to the other device.

15 Claims, 9 Drawing Sheets

(56) References Cited

OTHER PUBLICATIONS

Sung, "Performance Analysis of Superimposing-Coded Signatures Files", Foundations of Data Organization and Algorithms, vol. 730 of the series Lecture Notes in Computer Science, pp. 115-129.
Non-Final Office Action dated May 6, 2016 for U.S. Appl. No. 14/580,963.
A white-box DES implementation for DRM applications, Digital Rights Management workshop (DRM), 2002, 1-15.
Arndt, "Algorithms for Programmers—ideas algorithms and source code", 2004.
Bernstein, "Enumerating and counting smooth integers", 1991.
Billet, "Cryptanalysis of a white box AES implementation", Selected Areas in Cryptography-SAC 2004, 2004, 227-240.
Chow, "White-box cryptography and an AES implementation, Selected Areas in Cryptography-SAC 2002", (Kaisa Nyberg and Howard M. Heys, eds. Lecture Notes in Computer Science, vol. 2696, 2003, 1-15.
Elgamal, "A public key cryptosystem and a signature scheme based on a discrete logarithms", IEEE Transactions on Information Theory 31, 1985, 469-472.
Harvey Garner, "The residue number system, IRE Transactions on Electronic Computers", 1959, 140-147.
Jacob, et al., "Attacking an obfuscated cipher by injecting faults, Digital Rights Management Workshop-DRM 2002", Lecture Notes in Computer Science vol. 2696, Springer, 2003, 16-31.
Jean-Claude Bajard, et al., "An RNS montgomery modular multiplication algorithm", IEEE Trans. Computers 47, No. 7, 1998, 766-776.
Karl C. Posch, et al., "Modulo reduction in residue number systems, IEEE Trans. Parallel Distrib. Syst.", 1995, 449-454.
Karroumi, "Protecting white-box AES with dual ciphers, Information Security and Cryptology-ICISC 2010", Lecture notes in Computer Science vol. 6829, 2010, 278-291.
Peter L. Montgomery, "Modular multiplication without trial division,Mathematics of Computation", No. 170, 1985, 519-521.
Rivest, et al., "A Method for obtaining digital signatures and public-key cryptsystems, Communications of the ACM 21", 1978, 120-126.
Roy D. Merrill, "Improving digital computer performance using residue number theory, Electronic Computers", IEEE Transactions on EC-13, No. 2, 1964, 93-101.
Royle, "Combinatorial enumeration : Theory and Practice", 2004.
Stolee, "Ranking and unranking of combinations and permutations", http:// computational combinatorics.wordpress.com/2012/09/10 ranking -and-unranking-of-combinations-and-permutations/, Sep. 2012.
Yaying Xiao, et al., "A secure implementation of white-box AES, Computer Science and its Applications", CSA, 2009, 1-6.

* cited by examiner

SECURE TOKEN-BASED SIGNATURE SCHEMES USING LOOK-UP TABLES

CROSS REFERENCE TO RELATED APPLICATIONS

This application is a continuation-in-part of U.S. patent application Ser. No. 14/580,963, filed on Dec. 23, 2014, the entire disclosure of which is hereby incorporated herein by reference for all purposes.

TECHNICAL FIELD

Various embodiments disclosed herein relate generally to data encoding and digital signature and, more particularly but not exclusively, to encoding for RSA-based digital signature schemes.

BACKGROUND

Digital signature schemes commonly apply encoding processes to data prior to signing a message to ensure that the data conforms to a pre-chosen alphabet to which the scheme applies. For example, a standard RSA algorithm using a key 3-tuple of <N, e, d> first converts each symbol to a corresponding value between 0 and N. Other encoding schemes may be used for different sets of input values to enable signature schemes that exploit various mathematical properties of the values in the input value set.

After encoding, the encoded values are used to create a signature for transmission. Some encryption algorithms, such as RSA, utilize a modular exponentiation function to create such a signature. As an example RSA processes an encoded value a using the private key pair <N, d> by computing $a^d$ mod N. RSA would then verify the signature value, b, using the public key pair <N, e> by first computing $b^e$ mod N. A decoding function is then applied to the resulting value to retrieve the original value.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of a preferred embodiment adequate to allow those of ordinary skill in the art to make and use the inventive concepts will follow in later sections.

Various embodiments described herein relate to a non-transitory machine-readable storage medium encoded with instructions for execution by a server for generating cryptographic tokens, the non-transitory machine-readable storage medium comprising: instructions for generating a public token, $\tau$, based on an identifier associated with another device; instructions for generating a private token, L, as a modular exponentiation of the public token, $\tau$, using a private exponent, d, and modulus, N, from a cryptographic key; and instructions for communicating the private token, L, to the other device.

Various embodiments described herein relate to a device for generating cryptographic tokens, the device including: a network interface; a memory; and a processor in communication with the network interface and the memory, the processor being configured to: generate a public token, $\tau$, based on an identifier associated with another device; generate a private token, L, as a modular exponentiation of the public token, $\tau$, using a private exponent, d, and modulus, N, from a cryptographic key; and communicate the private token, L, to the other device.

Various embodiments described herein relate to a method performed by a server for generating cryptographic tokens, the method including: generating a public token, $\tau$, based on an identifier associated with another device; generating a private token, L, as a modular exponentiation of the public token, $\tau$, using a private exponent, d, and modulus, N, from a cryptographic key; and communicating the private token, L, to the other device.

Various embodiments are described wherein the instructions for generating a public token, $\tau$, based on an identifier associated with another device include instructions for digitally signing a value including the identifier based on a certificate of the server.

Various embodiments are described wherein the instructions for generating a public token, $\tau$, based on an identifier associated with another device include instructions for applying a publicly-known function to a value including the identifier.

Various embodiments are described wherein the instructions for generating a public token, $\tau$, based on an identifier associated with another device include: instructions for determining a triggering message, $m_T$; instructions for determining a triggering message response, $s_T$, based on the identifier; and instructions for generating the public token, $\tau$, based on the triggering message, $m_T$, and the triggering message response, $s_T$, such that use of the private token, L, to digitally sign the triggering message, $m_T$, will produce the triggering message response, $s_T$, as a signature.

Various embodiments additionally include instructions for causing the triggering message, $m_T$, to be transmitted to a suspected unauthorized user; instructions for receiving the triggering message response, $s_T$, from the suspected unauthorized user; instructions for extracting the identifier from the triggering message response, $s_T$; and instructions for identifying the other device as a traitor based on extracting the identifier.

Various embodiments additionally include instructions for generating a partial token, $\lambda$, based on the private token, L, whereby the private token, L, is recoverable using the partial token, $\lambda$, and a platform-specific function, g, of the other device, wherein the instructions for communicating the private token, L, to the other device include instructions for transmitting the partial token, $\lambda$, to the other device.

Various embodiments are described wherein: the platform-specific function, g, is associated with an inverse function, $g^{-1}$; and the instructions for generating a partial token, $\lambda$, include instructions for applying the inverse function, $g^{-1}$, to the private token.

Various embodiments are described wherein: the platform-specific function, g, is a non-invertible function; and the instructions for generating a partial token, $\lambda$, include: instructions for requesting from the other device an output from the platform-specific function, g, and instructions for computing the partial token, $\lambda$, as the bitwise exclusive OR (XOR) between the private token, L, and the output from the platform-specific function, g.

BRIEF DESCRIPTION OF THE DRAWINGS

In order to better understand various embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

In view of the growing contexts and applications for encryption, such as applications on untrusted platforms, recent efforts have been devoted to the concept of "white box cryptography," wherein cryptographic schemes are developed to be secure even when the cryptographic implementation is laid open to an attacker. White-box cryptography is concerned with the design and analysis of software implementations of cryptographic algorithms engineered to execute on untrusted platforms. Particularly, this is the scenario where the user of a particular device can decrypt messages (with a secret key) which are encrypted with his public key but is unable to extract or derive sufficient information to recover this secret key. Furthermore, it is assumed in such implementations that the user can be the attacker: e.g. the attacker has full access to the software implementation, can pause, alter and resume the execution of the software implementation at any time For example, in digital rights management systems, it is desirable to provide a content-consumer with the ability to easily authenticate themselves as a party that is entitled to access the content. It is also desirable, however, to prevent that content-consumer from sharing credentials with other parties for the purpose of provided those other parties with access to the same content that is only licensed to that original content-consumer.

One white-box approach to this scenario is to provide the content-consumer with the ability to digitally sign messages using a private key, d, assigned to the content-consumer without actually giving the private key, d, to the content-consumer. To that end, the content-consumer may be provided, instead, with a lookup table of pre-computed exponentiated values based on the private key, d. In various systems, for example, the look-up table may be provided to the content-consumer by, for example, a central digital rights management server for use in authenticating the content-consumer to one or more media servers serving the protected content. The content-consumer may then use this lookup table to compute digital signatures in spite of not knowing the value of their private key, d. It would be desirable to build upon these efforts by providing various improvements such as authentication of lookup tables and related values, traitor tracing, and platform binding.

It will be appreciated that, while various examples described herein are explained in the context of digital signature schemes, various aspects described herein may be adapted to data encryption schemes wherein data is encrypted with a public key and retrieved using a private key.

As detailed in co-pending application Ser. No. 14/580, 963, which is incorporated by reference above, modular exponentiations based on a secret exponent, d, can be calculated without access to the value of that secret exponent by using a lookup table, L, storing precomputed modular exponentiations of each element in a factor set, S, that includes all factors of the value to be exponentiated. The various examples of digital signatures schemes presented herein utilize a factor set, S, and lookup table, L, consisting each of only a single entry, referred to herein as public and private tokens, respectively. Various modifications of the examples provided herein to operate in conjunction with implementations using factor sets, S, and lookup tables, L, of multiple elements (i.e., multiple public and private tokens for use in a single modular exponentiation) will be apparent.

Figure 1:
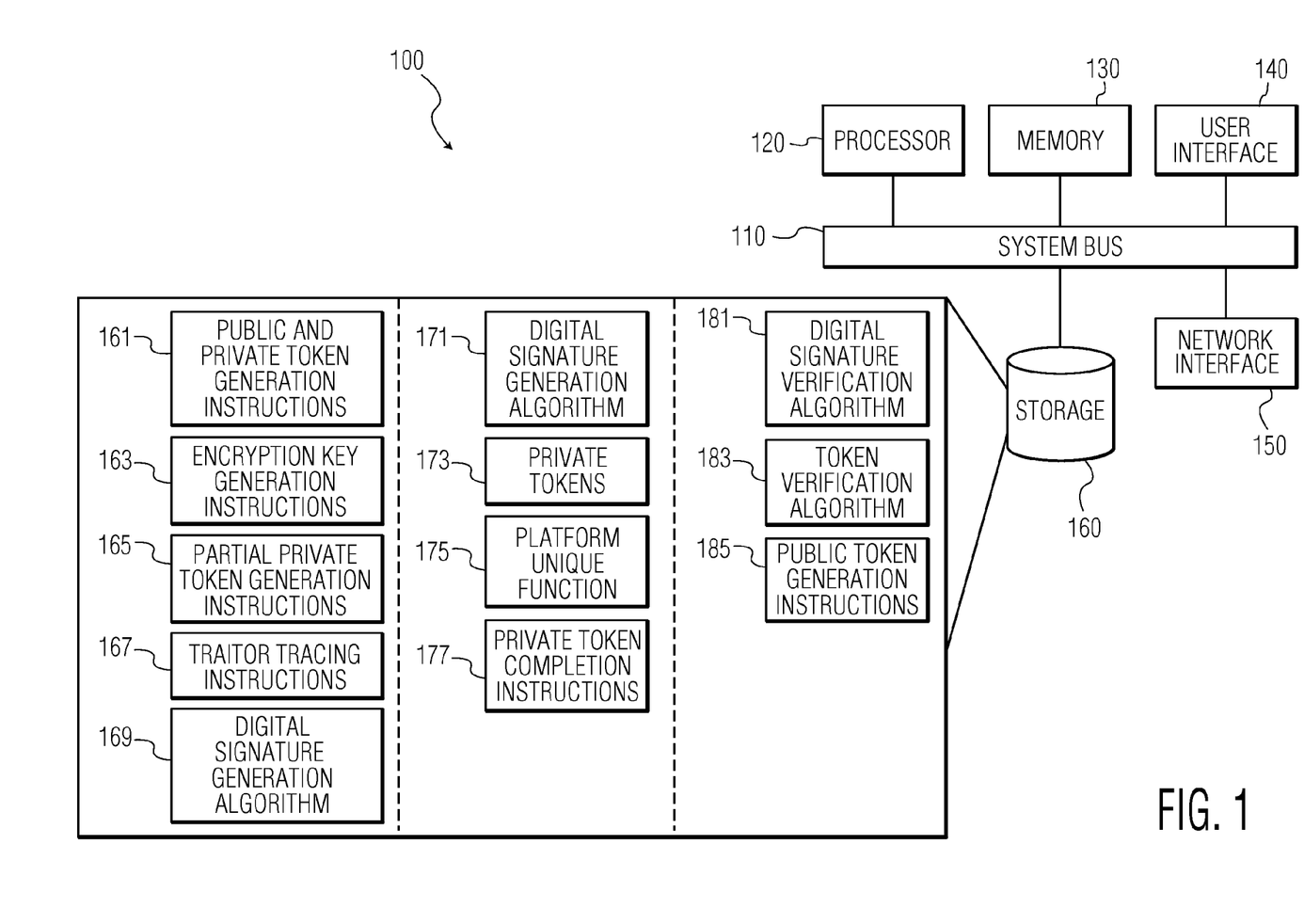
FIG. 1 illustrates an example of a hardware system for implementing the encoding and signature schemes described herein.

FIG. 1 illustrates an example of a hardware system 100 for implementing the encoding and signature schemes or the lookup table generation schemes described herein. The hardware system 100 may correspond to virtually any device that may participate in a digital signature scheme such as, for example, a personal computer, laptop, tablet, mobile communications device, server, blade, smart card, near field communication (NFC) device, or other device. For example, the hardware system may correspond to a set-top box for receiving and rendering digital content or a server for providing digital content. Various applications of the method described herein will be apparent such as, for example, digital rights management (DRM), banking applications, and generally protecting cryptographic keys in devices such as mobile phones and television set-top boxes.

As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in the memory 130 or the storage 150. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate.

For example, where the hardware device 100 implements a server for distributing tokens, such as a content server or application server, the storage 160 include public and private token generation instructions for generating sets of public tokens $\{\tau_i\}$ and sets of private tokens $\{L_i\}$ for use by other devices such as user devices for participating in a digital signature scheme. Various methods for generating public tokens $\tau_i$ having various desirable features will be described in greater detail below. The private tokens are generated as a modular exponentiation of the public token, $$L_i = \tau_i^d \bmod N,$$

where d is a secret exponent and N is a modulus, both belonging to a cryptographic key <d, e, N>.

The cryptographic key <d, e, N> may be unique to each device or user to which the tokens are to be provided, various groupings thereof, or may be the same for all participating devices in the system. In various embodiments, the device may also include cryptographic key generation instructions 163 for creating one or more cryptographic keys according to any known method appropriate for the cryptographic schemes to be used.

Various additional instructions may be included in the storage of a token generating device for enabling the various features described herein. For example, in embodiments implementing platform binding of tokens, the storage 160 may also include partial private token generation instructions such that partial token sets $\{\lambda_i\}$ are instead transmitted to other devices which may then use functions that are unique to those devices to derive the full private tokens $\{L_i\}$ for use in a digital signature scheme. In some embodiments, the storage 160 may include traitor tracing instructions for sending a specific traitor tracing message to a suspected unauthorized user and for analyzing a response thereto to identify a "traitor" user or device that has shared their private tokens, $\{L_i\}$, with the unauthorized user or device. In some embodiments implementing token certification, the storage 160 may also include a digital signature generation algorithm to digitally sign new tokens based on a certificate of the device 100.

Where the hardware device 100 implements a device for performing modular exponentiation such as, for example, a user device (e.g., a user computer or set top box) that requests delivery of content, the storage 160 may include a digital signature generation algorithm 171 that uses previously-received and stored private tokens 173 to compute modular exponentiations in the absence of a private exponent, d, to generate signatures to accompany outgoing messages or to respond to query messages requesting such a digital signature in return. The digital signature generation algorithm 169 may be the same as the digital signature generation algorithm 171 in some embodiments, while in other embodiments these two algorithms 169, 171 may be unique. An example of a digital signature generation algorithm will be described in greater detail below with respect to FIG. 3. In embodiments implementing platform binding for tokens, the storage 160 may include one or more platform unique functions 175 that are accessed by private token completion instructions 177 to generate full private tokens $\{L_i\}$ based on received partial tokens $\{\lambda_i\}$.

Where the device 100 implements a device for verifying signatures such as, for example, a content server or another user device, the storage may include a digital signature verification algorithm 181, examples of which will be explained in greater detail below. In some embodiments implementing certified tokens, the storage may also include a token verification algorithm 183 such as, for example, an algorithm for verifying a digital signature of a token issuer. In some embodiments, the token verification algorithm 183 may be the same instructions as the digital signature verification algorithm, simply applied against the token issuer's certificate rather than the credentials of the device that sent the primary signature undergoing verification. In other embodiments implementing ID-based tokens, the storage 160 may also include public token generation instructions 185 which may be the same instructions of the public and private token generation instruction 161 used for initially generating a public token.

In various embodiments, the various devices described above may be combined. For example, in some devices, the same device (e.g. a content server) may perform the functions of both the token issuer and signature verifier; in such embodiments, a single device may store instructions from both instruction sets 161-169 and 181-185. Various other modification will be apparent.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the hardware device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. In other embodiments, such as those embodiments wherein the device 100 is implemented in a cloud computing environment, the various components may be physically located in diverse machines. For example, the processor 120 may include a first microprocessor in a first data center server and a second microprocessor in a second data center server. Various additional arrangements will be apparent.

Figure 2:
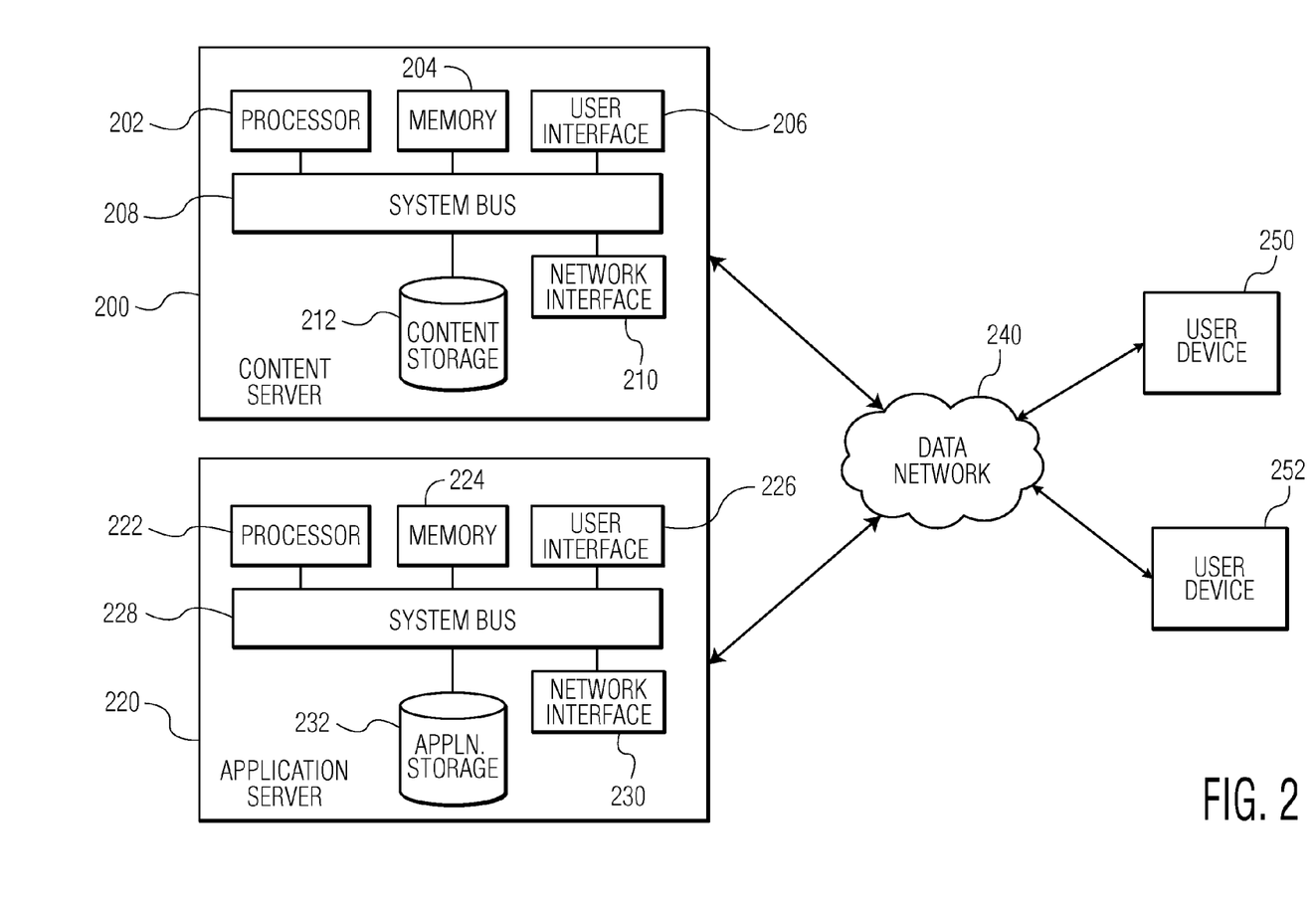
FIG. 2 illustrates an example of a system for providing a user device secure content and a software application that processes the secure content.

FIG. 2 illustrates an example of a system for providing a user device secure content and a software application that processes the secure content. The system includes a content server 200, application server 220, user devices 250, 252, and a data network 240. The user devices 250, 252 may request access to secure content provided by the content server 200 via data network 240. The data network can be any data network providing connectivity between the user devices 250, 252 and the content server 200 and application server 220. The user devices 250, 252 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 200. The software application may be downloaded from the application server 220. The software application may be obscured using the techniques described above as well as operate as described above. Once the user devices 250, 252 install the software application, the user device may then download secure content from the content server 200 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 200 may control the access to the secure content provided to the user devices 250, 252. As a result when the content server 200 receives a request for secure content, the content server 200 may transmit the secure content to the requesting user device Likewise, the application server 220 may control access to the software application provided to the user devices 250, 252. As a result when the content server 220 receives a request for the software application, the application server 220 may transmit the software application to the requesting user device. A user device requesting the software application or secure content may also be authenticated by the respective servers, before providing the software application or secure content to the user device.

The content server 200 may include a processor 202, memory 204, user interface 206, network interface 210, and content storage 212 interconnected via one or more system buses 208. It will be understood that FIG. 2 constitutes, in some respects, an abstraction and that the actual organization of the components of the device 200 may be more complex than illustrated.

The processor 202 may be any hardware device capable of executing instructions stored in memory 204 or storage 212. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 204 may include static random access memory (SRAM), dynamic RAM (DRAM), flash memory, read only memory (ROM), or other similar memory devices.

The user interface 206 may include one or more devices for enabling communication with a user such as an administrator. For example, the user interface 206 may include a display, a mouse, and a keyboard for receiving user commands.

The network interface 210 may include one or more devices for enabling communication with other hardware devices. For example, the network interface 210 may include a network interface card (NIC) configured to communicate according to the Ethernet protocol. Additionally, the network interface 210 may implement a TCP/IP stack for communication according to the TCP/IP protocols. Various alternative or additional hardware or configurations for the network interface 210 will be apparent.

The content storage 212 may include one or more machine-readable content storage media such as read-only memory (ROM), random-access memory (RAM), magnetic disk storage media, optical storage media, flash-memory devices, or similar storage media. In various embodiments, the content storage 212 may store content to be provided to users.

The application server 220 includes elements like those in the content server 200 and the description of the like elements in the content server 200 apply to the application server 220. Also, the content storage 722 is replaced by application storage 232. Further, it is noted that the content server and applications server may be implemented on a single server. Also, such servers may be implemented on distributed computer systems as well as on cloud computer systems.

As will be understood, the modular exponentiation, encoding, or digital signature methods described herein may be deployed and utilized within the system of FIG. 2 or similar systems in various manners. For example, the user devices 250, 252 may be provided by a manufacturer or other seller preconfigured to transmit signed messages to the content server 200 to request the provision of content. Alternatively, the user devices 250, 252 may not be fully preconfigured for such operation; instead, the application server 220 may communicate with the user devices 250, 252 to effect such configuration. For example, the application server may transmit code instructions for implementing the methods described herein or data defining one or more lookup tables.

Figure 3:
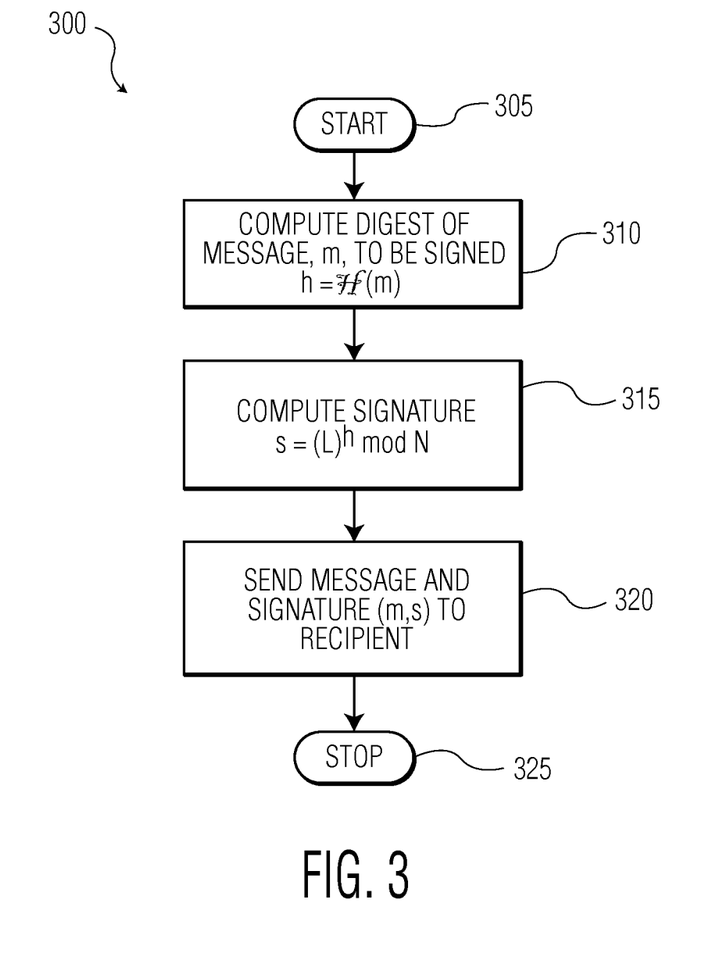
FIG. 3 illustrates an example of a method for digitally signing a message.

FIG. 3 illustrates an example of a method 300 for digitally signing a message. The method 300 may correspond to the digital signature generation algorithm 171 of FIG. 1. For example, in embodiments where a device requests content deliver, the device may execute a method such as method 300 to digitally sign the request message to prove the requestor's identity. In other embodiments, the method 300 may be executed to sign a received query message, m, for response to the query message. Various alternative contexts for performing a digital signature method such as method 300 will be apparent.

The method begins in step 305 and proceeds to step 310 where the device computes a digest, h, of a message, m, to be signed. For example, the message may be a request message requesting the delivery of content to the device. The digest may be computed according to any method such as applying a hash function to the entire message, $\mathcal{H}(m)$. Alternatively, in some embodiments, the full, non-digested method may be used for the digital signature, in which case step 310 may be omitted.

Next in step 315, the device computes the signature by computing the modular exponentiation of the digest, h, using a private token, L. When only one private token is used per signature generated (as in the examples provided herein), the modular exponentiation may be computed as $$s = L^h \bmod N.$$

For embodiments utilizing lookup tables having multiple entries, various alternative method for computing a modular exponentiation will be apparent such as, for example, the methods described in the application incorporated by reference above. Having computed the digital signature, s, the device transmits the digital signature, s, (potentially, along with the message, m) in step 320 to another device where the signature will be verified. The method then proceeds to end in step 325.

Various modifications to the digital signature verification method will be apparent in view of the following description of various additional features. For example, step 320 may be modified to additionally send a private token, $\tau_i$, index of the private/public token pair used (in embodiments where each token pair is used once and then discarded), i, or an identifier of the device executing the method 300, $ID_A$.

After receiving a message and signature pair, the recipient device may proceed to verify the signature. For example, where the recipient device is a content server, the server may verify the signature and begin serving content only if the signature is verified. Various other contexts and consequences for signature verification will be apparent.

Figure 4:
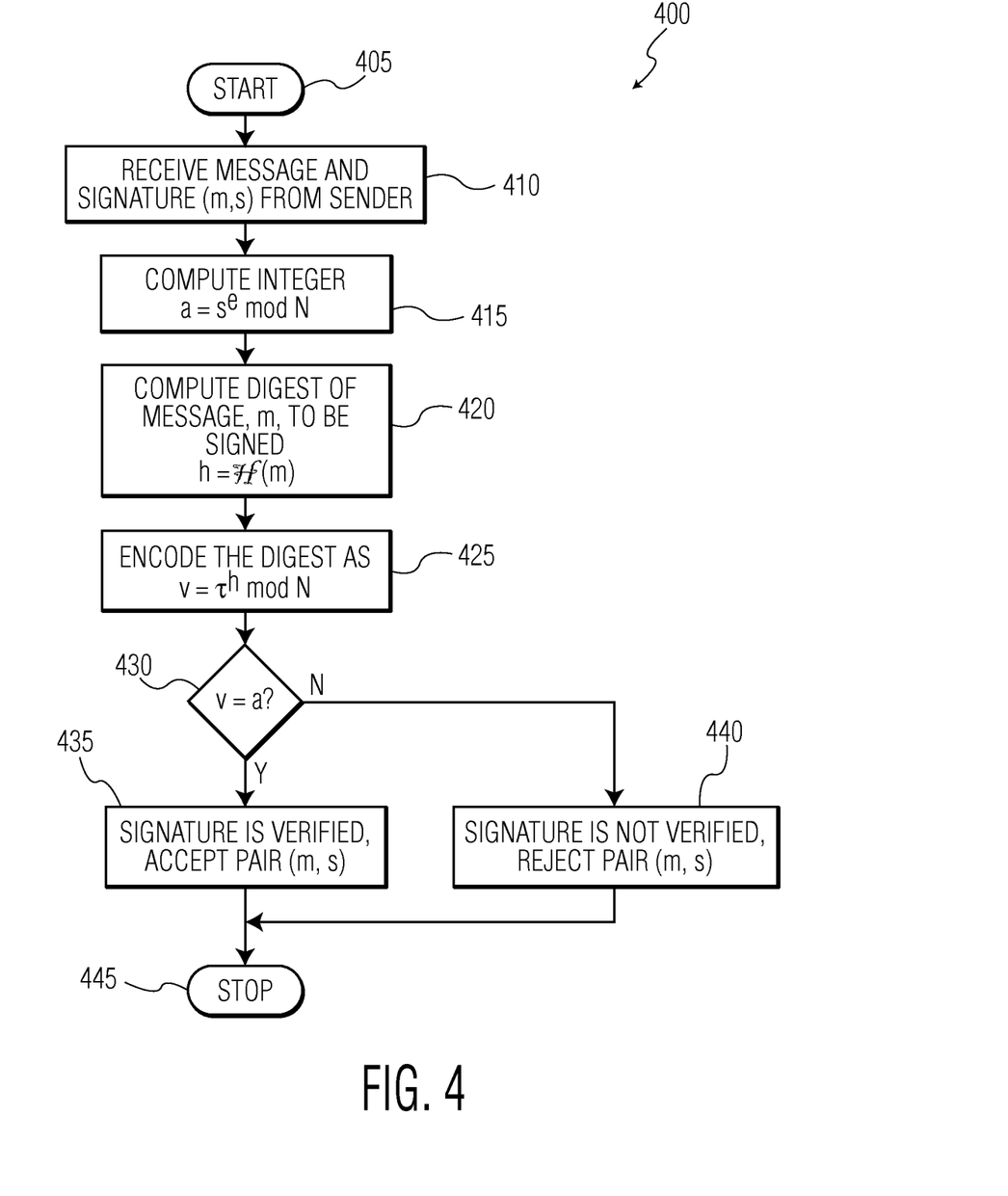
FIG. 4 illustrates an example of a method for verifying a digital signature.

FIG. 4 illustrates an example of a method 400 for verifying a digital signature. The method 300 may correspond to the digital signature verification algorithm 181 of FIG. 1. The method 400 may operate in conjunction with the method 300 (or a method similar thereto).

The method 400 begins in step 405 and proceeds to step 410 where the device receives a message and signature from a sending device. For example, the signature, s, may be generated and transmitted to the device by a sending device executing the method 300 or a method similar thereto. Next, in step 415, the device computes the modular exponentiation of the signature to produce the value 1. The modular exponentiation in step 415 may be computed according to any method such as straightforward mathematical computation, computation of modular exponentiations of the prime factors of the signature, or even reference to a separate lookup table precomputed with modular exponentiations based on the public exponent e for all prime numbers less than N.

In step 420, the device computes the digest of the message, m, to produce a value, h. As with the digest step 310 of method 300, the digest function may be virtually any function such as a preselected and agreed-upon hash function. Alternatively, where no digest is computed, the message m may be taken as-is as the value h. In step 430, the device determines whether the recovered value, a, matches the digest value, h. If not, the method proceeds to step 440 where the device determines that the signature cannot be verified. Otherwise, the method proceeds to step 435 where the device determines that the signature is verified and accepts the message pair as authentic (e.g. to proceed in responding to a request contained in the message). After making a determination as to verification in step 435 or 440, the method proceeds to end in step 445.

Various modifications to the method 400 to implement the various features described herein will be apparent. For example, a token verification or token generation step may be inserted somewhere before step 425 to implement certified or ID-based tokens. Various additional modifications will be apparent.

Figure 5:
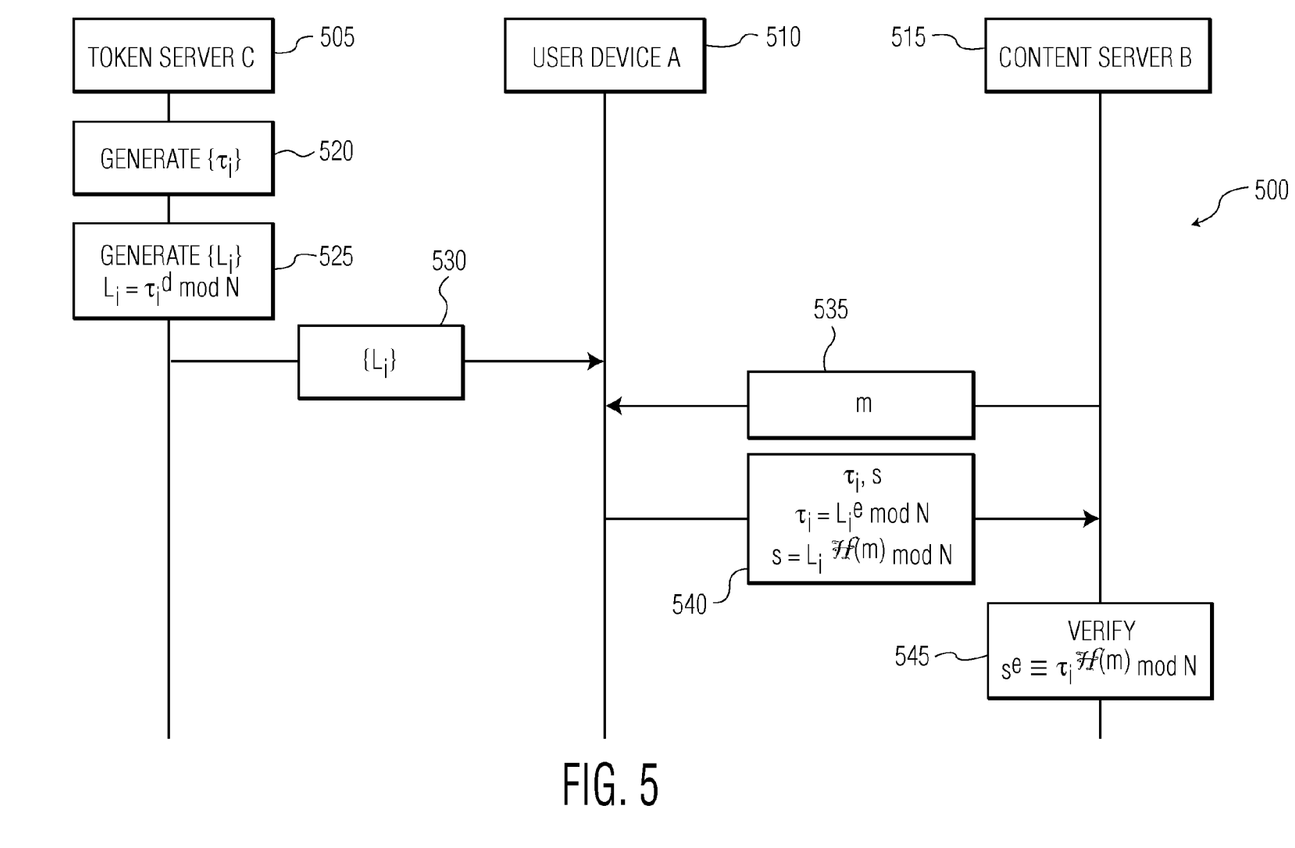
FIG. 5 illustrates a first example of a digital signature sequence.

FIG. 5 illustrates a first example of a digital signature sequence 500. This sequence 500 occurs between a token server C 505, a user device A 510, and a content server B 515. As noted above, in some embodiments, two or more of these devices may be combined with other devices. For example, the token server C 505 and the content server B 515 may be the same device. In such embodiments, this single device is responsible for performing any steps and sending/receiving any messages attributed to either such combined device.

The sequence 500 illustrates an example of a basic message exchange for performing a digital signature process. Various modifications to this basic exchange will be described in greater detail below with respect to FIGS. 6-9. Corresponding modifications to the above described methods to implement such alternative examples of sequences will be apparent. Additionally, various modifications to the following example sequences will be apparent. For example, the sequence described with respect to FIG. 6 or 7 may be combined with the sequence described in FIG. 8 or 9. Various additional modifications will be apparent for simultaneously implementing multiple features described herein with respect to the following sequences.

As previously noted, various embodiments allow for use of each public/private token pair once. Thereafter, the token pair is immediately discarded. During the setup phase, the token server C 505 therefore generates multiple pairs of tokens for provision to the user device A 510 as an ordered set. The token pair identified as $(\tau_i, L_i)$ will be understood to refer to the next token pair in the sequence. Specifically, at step 520, the token server C 505 generates a set of public tokens, $\{\tau_i\}$. In some embodiments, these public tokens may be arbitrarily generated or, as will be seen in the examples described below, based on various information such as an id of the user device A 510. Next, the token server 505 generates a set of private tokens, $\{L_i\}$, based on the set of public tokens, $\{\tau_i\}$ using a modular exponentiation, $$L_i = \tau_i^d \bmod N.$$

After generating the private tokens the token server C 505 transmits a message 530 to the user device 510 including the private tokens, $\{L_i\}$. It is worth noting that the token server C 505 need not also transmit the public tokens $\{\tau_i\}$ to the user device 510 (although in some embodiments, it may) because the public tokens $\{\tau_i\}$ may be retrieved, if needed, using the private tokens, $\{L_i\}$ and the cryptographic key public exponent, e, and modulus, N, $$\tau_i = L_i^e \bmod N.$$

Some time after these set-up steps, the content server B 515 may send a message, m, 535 to query the user device 510 for a signature (e.g. to verify the user device A's 510 authenticity after receiving a content request). In response, the user device 510 generates a signature s using the current private token $L_i$, according to any method such as, for example, the digital signature methods described above. The user device A 510 then sends a message 540 to the content server B 515 including both the signature, s, and the current public token, $\tau_i$. The content server B 515 then verifies 545 the received signature using the received public token, $\tau_i$, according to any appropriate method such as, for example, the signature verification method described above. Thus, the sequence 500 illustrates a full digital signature scheme where a content server C 505 performs initial setup for a user device A 510 to prove its identity to a content server B 515 without having access to a private exponent, d, of a cryptographic key.

The signature verification method of FIG. 5 does not include any authentication of the user device A's 510 public key, e, or public token, $\tau_i$. The public key may be authenticated according to any known technique; alternatively, the content server C 505 may allocate the same public key to all entities managed thereby. The public key may then become a system-wide parameter that may be hard-coded in all devices that verify signatures.

It would be desirable to also authenticate the public token, $\tau_i$, because, without such a step, any entity with access to the public components of the cryptographic key <N, e> could generate a valid pair of tokens <$\tau_i$, $L_i$> by picking $L_i$ at random and then computing, $$\tau_i = L_i^e \bmod N.$$

Token authentication may provide some assurance that the tokens have been computed by an entity in possession of the private key <N, d> and that this token is bound to a well-identified identity. One method would be for the token server C 505 to sign ever token generated and embed in the certificate the identity of the token recipient; whenever the token server C 505 to it also generates a corresponding authentication certificate which the user device A 510 must store along with the private token, $L_i$. This additional storage requirement introduces an inefficiency which would be desirable to remove. As described below, there are two approaches to authenticating tokens that do not introduce this additional storage overhead: token certification and ID-based tokens.

Figure 6:
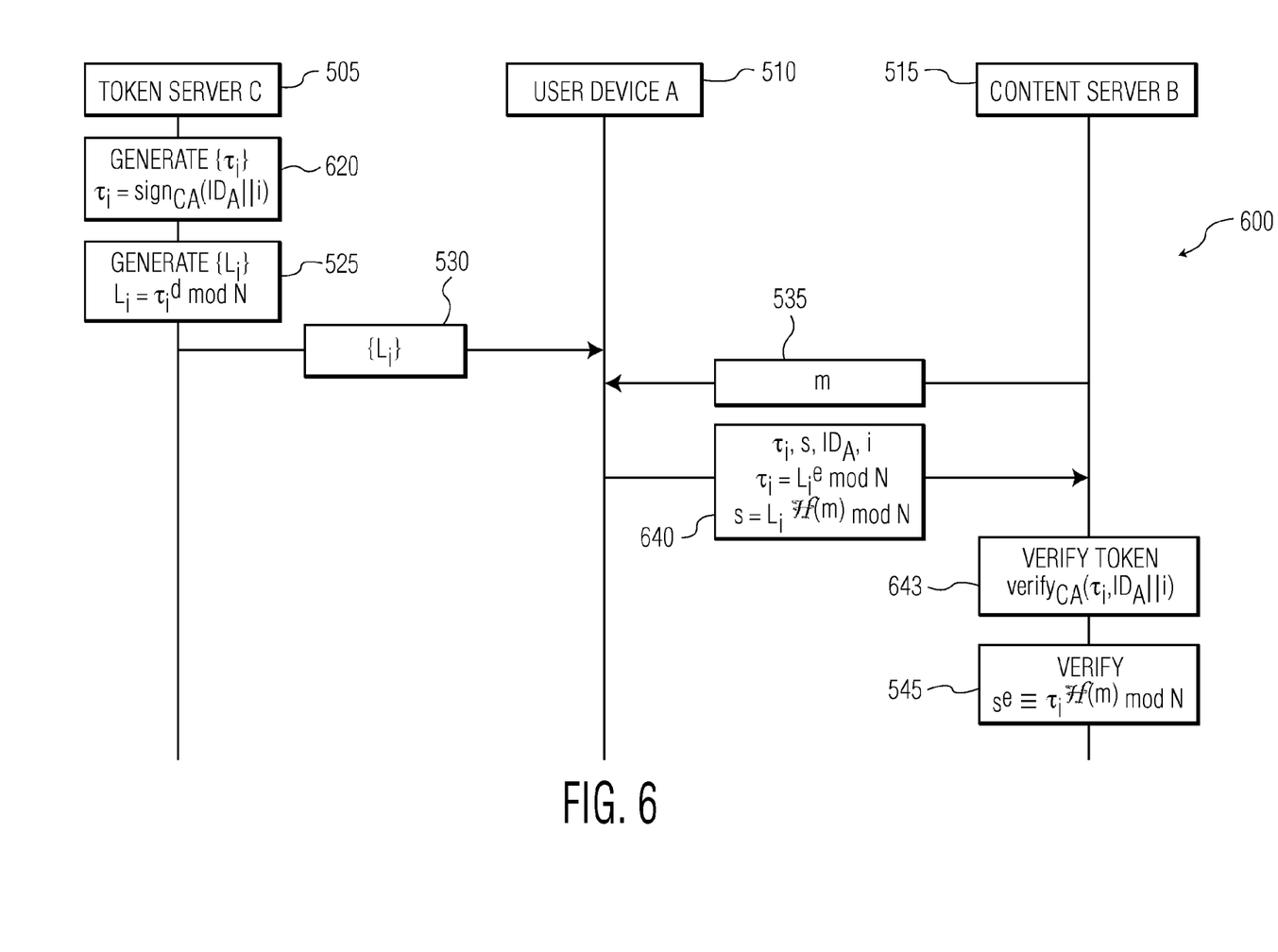
FIG. 6 illustrates a second example of a digital signature sequence including token certification.

FIG. 6 illustrates a second example of a digital signature sequence 600 including token certification. This sequence 600 is mostly similar to the basic sequence 500 except for the following differences. According to this sequence 600, the public token is created by the token server 505 from the token server C's 505 own certificate. The token server C begins by constructing a preliminary token. Note that virtually any function may be used here as long as it can be similarly applied by the content server B 515 for verification purposes. In the example shown, the token server C 505 appends a sequence identifier, i, to the end of the user device A's 510 identifier, $ID_A$.

After creating the preliminary token, the token server C 505 uses the preliminary token to generate a signature using its own certificate (e.g., a cryptographic key <$N_C$, $d_C$, $e_C$> belonging to the token server C 505 itself). The digital signature method may be any verifiable signature creation method, including one of those described herein. Thus, in the example shown, $$\tau_i = \text{sign}_{CA}(ID_A \| i)$$

where $\text{sign}_{CA}(x)$ is the signature function of the token server C 505.

When the user device A 510 sends the message 640 including the public token, $\tau_i$, and signature, s, to the content server B 515, the user device A 510 also sends its own identifier, $ID_A$, and current token sequence number, i. Using this information, the content server B 515 performs an additional token verification step 634, $$\text{verify}_{CA}(\tau_i, ID_A \| i),$$

where $\text{verify}_{CA}(x,y)$ is the verification function corresponding to $\text{sign}_{CA}(x)$. If the token is not verified, the signature may be rejected as unverified and the content server B 515 may not proceed to verify the signature itself in step 545.

In various alternative embodiments, the user device A 510 may omit sending the identifier $ID_A$, and index, i, if the token server C's 505 features message recovery (i.e., $\text{verify}_{CA}(x)$ returns as a result the original signed message). Thus, the technique shown in this example sequence 600 allows for storing the public token certificate at no cost. Additionally, the certification process may guarantee the authenticity of the public token index, which the content server B 515 may use to verify that private tokens are used only once (e.g., by enforcing that signature indices are strictly increasing).

Figure 7:
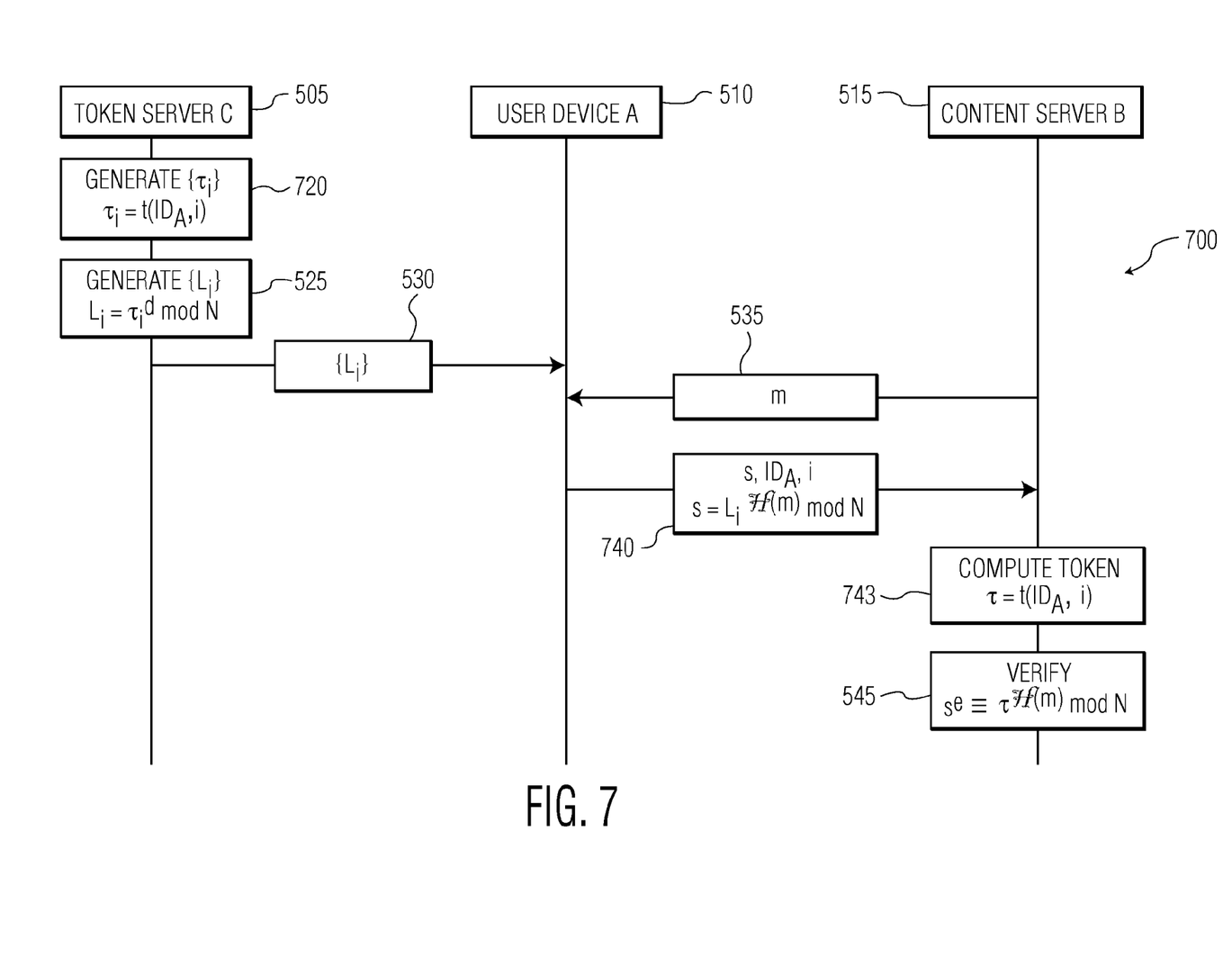
FIG. 7 illustrates a third example of a digital signature sequence including ID-based tokens.

FIG. 7 illustrates a third example of a digital signature sequence 700 including ID-based tokens. As an alternative to token certification, the system could derive public tokens from publicly known information. As shown, this sequence 700 is mostly similar to the basic sequence except for the following differences.

First, in the public token generation step 720, the token server C 505 uses a publicly know function, t, to generate the public token, $\tau_i$. The function, t, may be virtually any function that can be executed by both the token server C 505 and the content server B 515. As shown, the function, t, takes as input the token index, i, and identifier of the intended user of the token, $ID_A$. The output of the function, t, is taken as the public token, $\tau_i$.

Later, when the user device A 510 transmits the message 740 including the signature, it need not also transmit the public token, $\tau_i$. Instead, the user device A 510 transmits its identifier, $ID_A$, and token index, i, from which the content server B 515 may derive the public token, $\tau_i$, using the public function t in step 743.

One recommended practice when designing security applications that use distributed secret keys is to detect when such keys are compromised and to react by black listing the leaked keys. For example, in a content streaming application, if a malicious user is able to extract an authentication key from a genuine user, the malicious user will be able to create copies of the streaming client that will be accepted as genuine.

Typically, the content server C 515 would be capable of detecting the leak in such a scenario. For example, it may detect that many authentication requests are done with the same secret keys but for clients with different network addresses. Next, the content server C 515 attempts to identify the source of the leak by identifying from which client the leaked key originating. This concept is referred to herein as "traitor tracing." If the identity is disclosed during the authentication step, the tracing is straightforward. However, tracing may be more difficult when authentication is done anonymously or is token-based.

According to the third example, a signature-based traitor tracing solution is provided. Similar to the concept of fingerprinting, the sequence 700 embeds secret identifying information in the signature token and that can be revealed by the entity that generated the token. This method may be particularly useful where the token server C 505 only has access to the final signature and is not also running the protocol.

Figure 8:
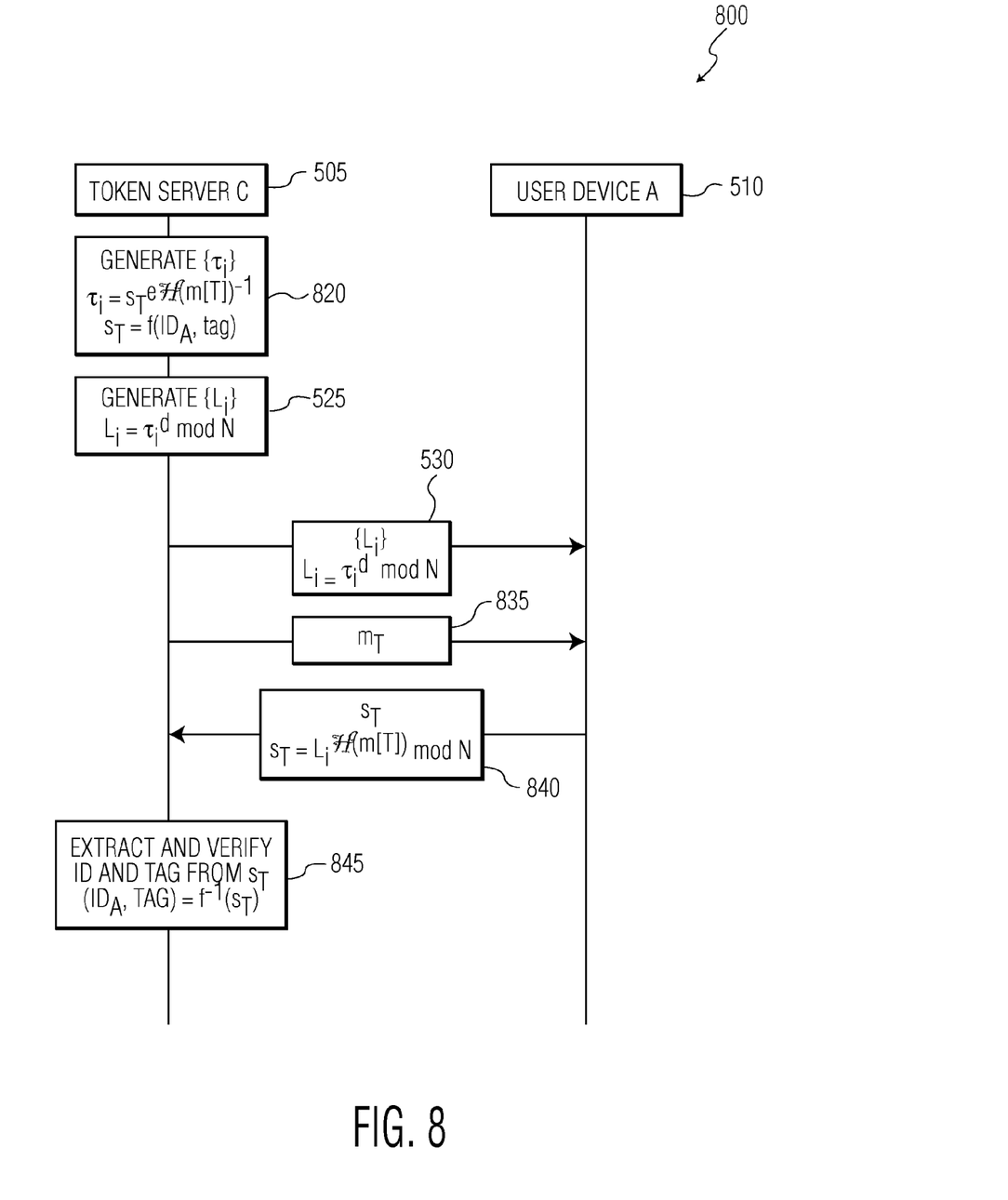
FIG. 8 illustrates a fourth example of a digital signature sequence enabling traitor tracing.

FIG. 8 illustrates a fourth example of a digital signature sequence 800 enabling traitor tracing. The sequence begins with the token server C 505 selecting a desired response signature, $s_T$, to be received in response to a traitor tracing triggering message, $m_T$. Specifically, it is this response signature, $s_T$, which will identify the source of a key. For example, this value may be defined as $$s_T = f(ID_A, i, \text{tag})$$

where the function is a function such as an append function and the tag is a value such as a checksum or a value indicating that the signature, $s_T$, is related to traitor tracing. The token server C 505 also determines which message, $m_T$, will be used to elicit the traitor tracing response. This message, $m_T$, may be any arbitrarily selected value. From these values, the token server A 505 is able to calculate a public token as, $$\tau_i = s_T^{eH(m_T)-1}.$$

After setup and in step 835, the token server C 505 or another device causes the triggering message to be transmitted to the user device A 510 (or another device suspected of using a leaked key). In some embodiments, the token server C 505 may cause transmission of the message 835 through an intermediary such as, for example, the content server B 515. Using the private key constructed through steps 820 and 525, the user device A will compute a signature that is equivalent to the initially selected triggering response, $s_T$. In other words, due to the specific computation of the public token (upon which the private token is based), computation of a signature based on the triggering message will always result in the chosen response signature, $s_T$, which the user device A 510 returns in a message 840. The private tokens $L_i$ are also still useful for digitally signing messages other than the triggering message, but the operation of the digital signature calculations will only act to unobscure the embedded information when the triggering message, $m_T$, is signed.

The token server C 505 is then able to extract and verify the ID from the signature, $s_T$, using the inverse of the function initially used to embed the identifying information in the signature. For example, if the function, f, was a simple append function, the inverse function $f^1$ may simply parse out the individual items from the signature $s_T$. In the illustrated example, the user device 510 is shown to be using its own tokens because its identifier, $ID_A$, is extracted from the signature, $s_T$. If, on the other hand, the same sequence were performed with another suspected malicious client rather than user device A 510, the extraction of the user device A's 510 identifier, $ID_A$, would identify the user device A 510 as the source of the leaked tokens. The token server C 505 also verifies the validity of the tag; if the tag is incorrect, the token server C 505 may reject $ID_A$ as the identity of the signer. Various modifications will be apparent. For example, a more complex mapping function, f, may be used such as, for example, encryption of a simple constant tag or a signature over the identifier and index.

Figure 9:
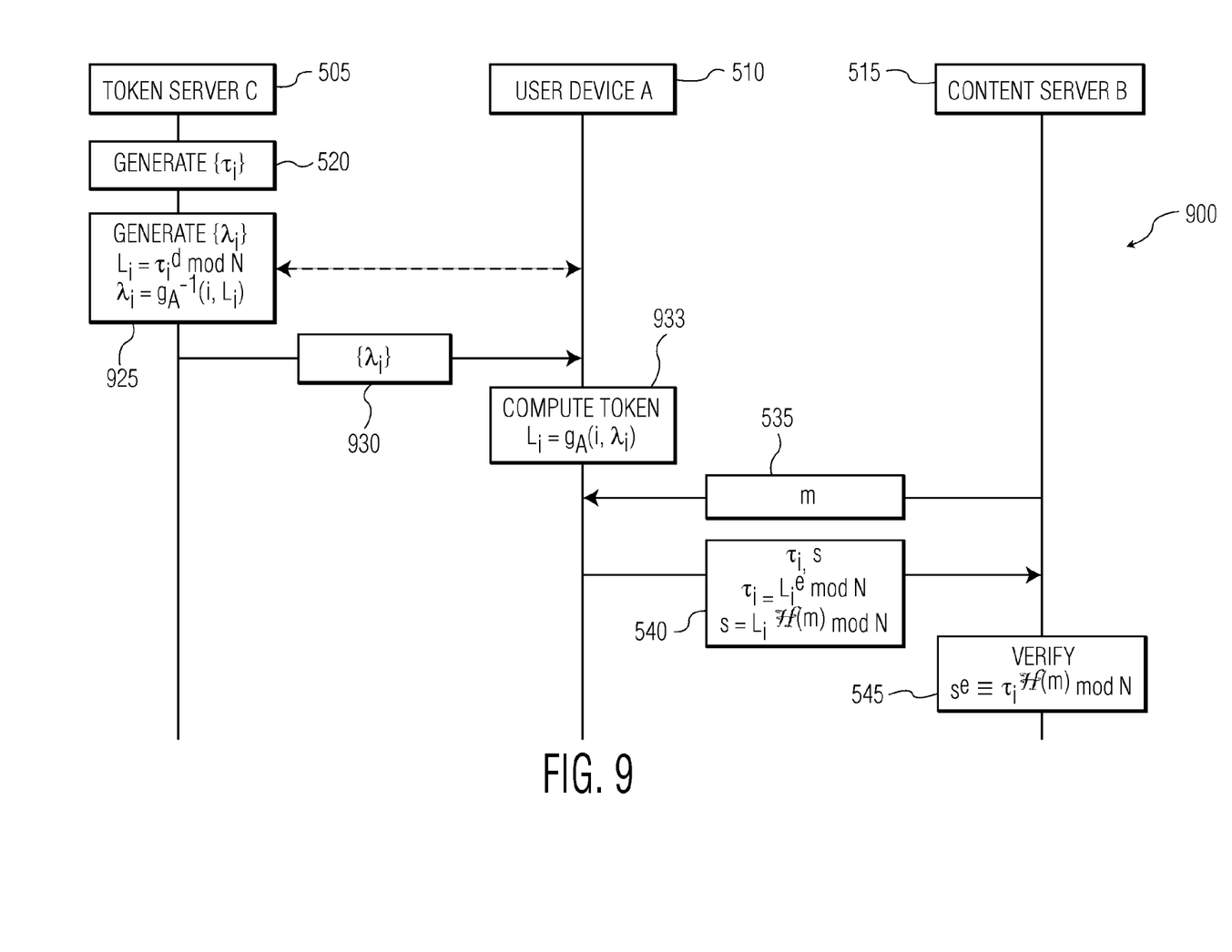
FIG. 9 illustrates a fifth example of a digital signature sequence including platform binding.

FIG. 9 illustrates a fifth example of a digital signature sequence 900 including platform binding. According to this feature, the software implementation will only give correct result on a particular platform, thereby providing protection against code lifting where software is copied from the original platform and run on another similar platform. With platform binding, this copy would not produce correct results and hence be useless. As will be seen, in this example a token-based platform binding technique is used. The token server C 505 only gives partial tokens, $\lambda_i$, that yield usable private tokens, $L_i$, when used as input to a platform-specific function, $g_A$.

The sequence 900 is mostly similar to the basic sequence 500 with the following exceptions. First, in step 925, after generating the set of private tokens, $\{L_i\}$, the token server C 505 generates a set of partial tokens, $\{\lambda_i\}$, using an inverse function, $g_A^{-1}$, to a platform specific function, $g_A$, of the user device. The platform-specific function, $g_A$, may be any function that can only be efficiently computed on the user device A 510. For example, the platform-specific function may utilize data, process, or environment information that are unique to the user device A 510. Various other types of platform-specific functions will be apparent. Thus, in some embodiments, the token server C 505 itself is unable to apply the inverse function, $g_A^{-1}$; instead, step 925 may include the token server C 505 requesting from the user device A 510 the output from the inverse function, $g^{-1}$ (or from the platform-specific function, g, itself when the inverse function must be constructed by the token server C 505 as will be explained in greater detail below). Then, instead of sending the private tokens $\{L_i\}$, the token server C 505 communicates the private tokens to the user device A 510 by sending a message 930 including these partial tokens, $\{\lambda_i\}$. From these values, the user device A 510 is able to recover the private keys $\{L_i\}$ by applying the platform-specific function.

Where the selected function, $g_A$ is an invertible function, the inverse function, $g^{-1}$, is easily applicable to the index and private token, $L_i$ to obtain a partial token, $\lambda_i$. In the likely case that the function, $g_A$ is not invertible, an inverse function can be constructed for the purposes of partial token creation. For example, in such a case, the partial token may be defined as the bitwise exclusive OR (XOR) of the private token, $L_i$, with the output of the platform-specific function, g, $$\lambda_i = L_i \oplus g_A(i).$$

To obtain the private key, the user device would then use a similar function:

$$L_i = \oplus g_A(i).$$

According to the foregoing, various embodiments enable encoding and modular exponentiation (e.g. to generate digital signatures) without access to a secret exponent, d. For example, by providing a pre-computed lookup table including modular exponentiations of the factors of the values to be modular exponentiated, a white-box implementation may nonetheless compute the modular exponentiation without access to the secret exponent, d. Additionally, various modifications described herein enable added features such as certified tokens, ID-based tokens, traitor tracing, or platform binding.

It should be apparent from the foregoing description that various embodiments of the invention may be implemented in hardware. Furthermore, various embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a server for generating cryptographic tokens, the non-transitory machine-readable storage medium comprising:
instructions for generating, by the server, a public token, τ, based on an identifier associated with a user device;
instructions for generating, by the server, a private token, L, as a modular exponentiation of the public token, τ, using a private exponent, d, and modulus, N, from a cryptographic key;
wherein the instructions for generating the public token, τ, based on the identifier associated with the user device comprise: instructions for determining a triggering message, $m_T$;
instructions for determining a triggering message response, $s_T$, using a platform-specific function, g, based on the identifier associated with the user device, a public token index, and a tag; and
instructions for generating the public token, τ, based on the triggering message, $m_T$, and the triggering message response, $s_T$, wherein use of the private token, L, to digitally sign the triggering message, $m_T$, will produce the triggering message response, $s_T$, as a signature;
and instructions for communicating the private token, L, to the user device;
instruction for transmitting, by the server after generation of the public and private tokens and communication of the private token to the user device, the triggering message to the user device; the user device computes a signature that is equivalent to the triggering message response;
instruction for receiving, by the server, the triggering message response from the user device;
instruction for extracting and verifying, by the server, a device identifier from the triggering message response using an inverse of the platform-specific function q, an inverse function $g^{-1}$, and confirming the device identifier is same as the identifier associated with the user device;
instruction for determining the user device as a source of leaked tokens when the device identifier is different than the identifier associated with the user device and belongs to another device, wherein the another device is a suspected unauthorized user.

2. The non-transitory machine-readable storage medium of claim 1, wherein the instructions for generating the public token, τ, based on the identifier associated with the user device comprise instructions for digitally signing a value including the identifier based on a certificate of the server.

3. The non-transitory machine-readable storage medium of claim 1, wherein the instructions for generating the public token, τ, based on the identifier associated with the user device comprise instructions for applying a publicly-known function to a value including the identifier.

4. The non-transitory machine-readable storage medium of claim 1, further comprising: instructions for generating a partial token, λ, based on the private token, L, whereby the private token, L, is recoverable using the partial token, λ, and the platform-specific function, g, of the user device, wherein the instruction for communicating the private token, L, to the user device comprise instructions for transmitting the partial token, λ, to the user device.

5. The non-transitory machine-readable storage medium of claim 4, wherein:
the platform-specific function, g, is associated with the inverse function, $g^{-1}$; and the instructions for generating the partial token, λ, comprise instructions for applying the inverse function, $g^{-1}$, to the private token.

6. The non-transitory machine-readable storage medium of claim 4, wherein: the platform-specific function, g, is a non-invertible function; and
the instructions for generating a partial token, λ, comprise:
instructions for requesting from the user device an output from the platform-specific function, g, and
instructions for computing the partial token, λ, as the bitwise exclusive OR (XOR) between the private token, L, and the output from the platform-specific function, g.

7. A server for generating cryptographic tokens, the server comprising:
a network interface;
a memory; and
a processor in communication with the network interface and the memory, the processor being configured to:
generate a public token, τ, based on an identifier associated with a user device; generate a private token, L, as a modular exponentiation of the public token, τ, using a private exponent, d, and modulus, N, from a cryptographic key;
wherein generating the public token, τ, based on the identifier associated with the user device comprise: determining a triggering message, $m_T$; determining a triggering message response, $s_T$, using a platform-specific function, g, based on the identifier associated with the user device, a public token index, and a tag; and
generating the public token, τ, based on the triggering message, $m_T$, and the triggering message response, $s_T$, wherein use of the private token, L, to digitally sign the triggering message, $m_T$, will produce the triggering message response, $s_T$, as a signature;
and communicate the private token, L, to the user device;
transmit, by the server, after generation of the public and private tokens and communication of the private token to the user device the triggering message to the user device; the user device computes a signature that is equivalent to the triggering message response;
receive, by the server, the triggering message response from the user device;
extract and verify, by the server, a device identifier from the triggering message response using an inverse of the platform-specific function g, an inverse function $g^{-1}$, and confirming the device identifier is same as the identifier associated with the user device;
determine, the user device as a source of leaked tokens when the device identifier is different than the identifier associated with the user device and belongs to another device, wherein the another device is a suspected unauthorized user.

8. The device of claim 7, wherein, in generating the public token, τ, based on the identifier associated with the user device, the processor is configured to digitally sign a value including the identifier based on a certificate of the server.

9. The device of claim 7, wherein, in generating the public token, τ, based on the identifier associated with the user device the processor is configured to apply a publicly-known function to the value including the identifier.

10. The device of claim 7, wherein the processor is further configured to:
generate a partial token, $\lambda$, based on the private token, L, whereby the private token, L, is recoverable using the partial token, $\lambda$, and the platform-specific function, g, of the user device,
wherein, in communicating the private token, L, to the user device, the processor is configured transmit the partial token, $\lambda$, to the user device.

11. The device of claim 10, wherein:
the platform-specific function, g, is associated with the inverse function, $g^{-1}$; and in generating the partial token, $\lambda$, the processor is configured to apply the inverse function, $g^{-1}$, to the private token.

12. The device of claim 10, wherein:
the platform-specific function, g, is a non-invertible function; and
in generating a partial token, $\lambda$, the processor is configured to:
request from the user device an output from the platform-specific function, g, and compute the partial token, $\lambda$, as the bitwise exclusive OR (XOR) between the private token, L, and the output from the platform-specific function, g.

13. A method performed by a server for generating cryptographic tokens, the method comprising:
generating, by the server, a public token, $\tau$, based on an identifier associated with a user device;
generating, by the server, a private token, L, as a modular exponentiation of the public token, $\tau$, using a private exponent, d, and modulus, N, from a cryptographic key;
wherein generating the public token, $\tau$, based on the identifier associated with the user device comprise:
determining a triggering message, $m_T$;
determining triggering message response, $s_T$, using a platform-specific function, g, based on the identifier associated with the user device, a public token index, and a tag; and
generating the public token, $\tau$, based on the triggering message, $m_T$, and the triggering message response $s_T$, wherein the use of the private token, L, to digitally sign the triggering message, $m_T$, will produce the triggering message response, $s_T$, as a signature;
and communicating the private token, L, to the user device;
transmitting, by the server after generation of the public and private tokens and communication of the private token to the user device, the triggering message to the user device; the user device computes a signature that is equivalent to the triggering message response;
receiving, by the server, the triggering message response from the user device;
extracting and verifying, by the server, a device identifier from the triggering message response using an inverse of the platform-specific function g, an inverse function $g^{-1}$, and confirming the extracted device identifier is same as the identifier associated with the user device;
determining the user device as a source of leaked tokens when the extracted device identifier is different than the identifier associated with the user device and belongs to another device, wherein the another device is a suspected unauthorized user.

14. The method of claim 13, wherein the step of generating the public token, $\tau$, based on the identifier associated with the user device comprises digitally signing a value including the identifier based on a certificate of the server.

15. The method of claim 13, wherein the step of generating the public token, $\tau$, based on the identifier associated with the user device comprises applying a publicly-known function to a value including the identifier.

* * * * *